Figure 1:
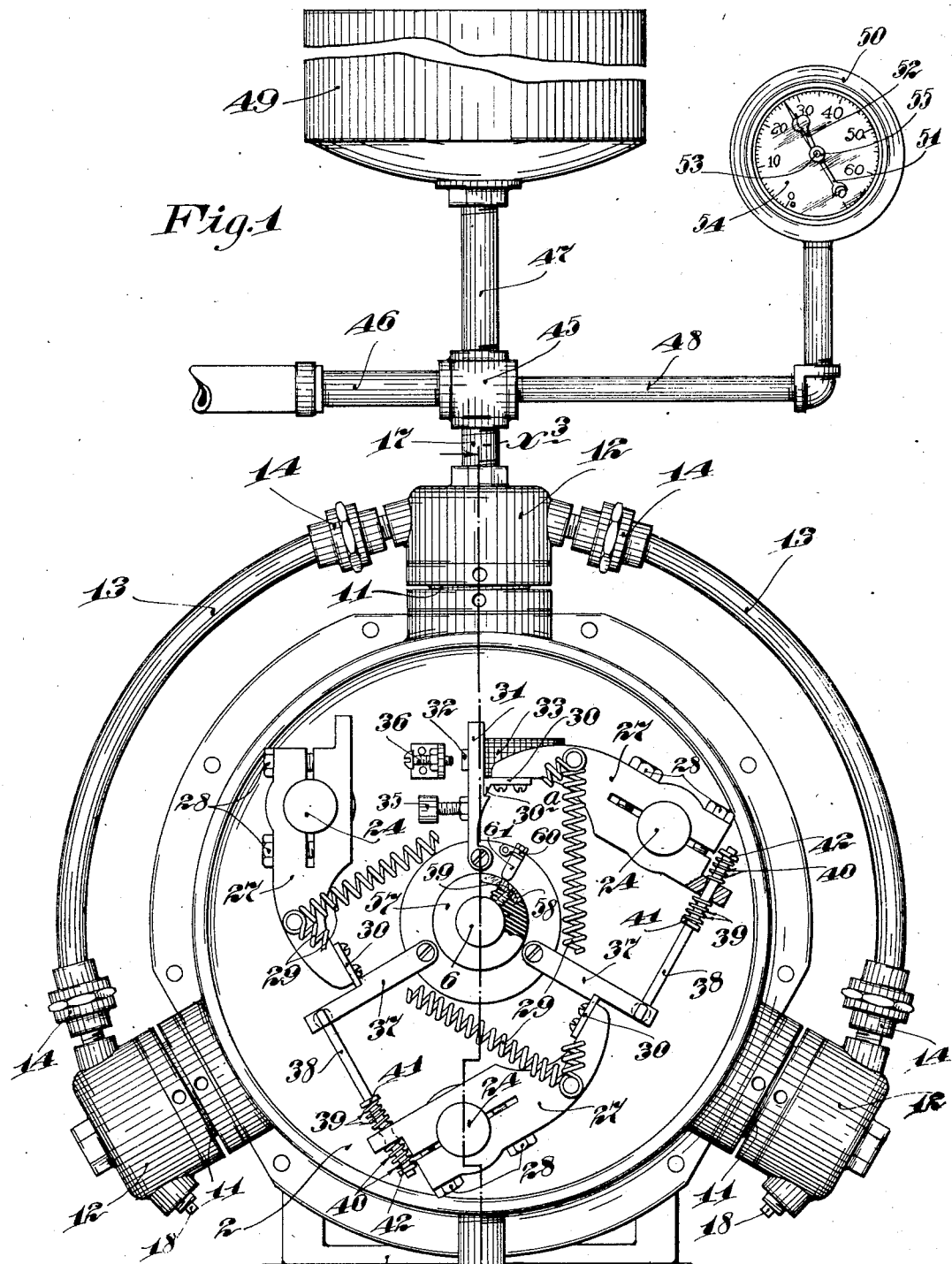

R. C. MEALEY.
MULTICYLINDER PUMP.
APPLICATION FILED JULY 21, 1913.

1,109,349.

Patented Sept. 1, 1914.

3 SHEETS—SHEET 1.

Witnesses:
Geo. Knutson
E. C. Skinkle

Inventor:
Robert C. Mealey
By his Attorneys,
Williamson Merchant

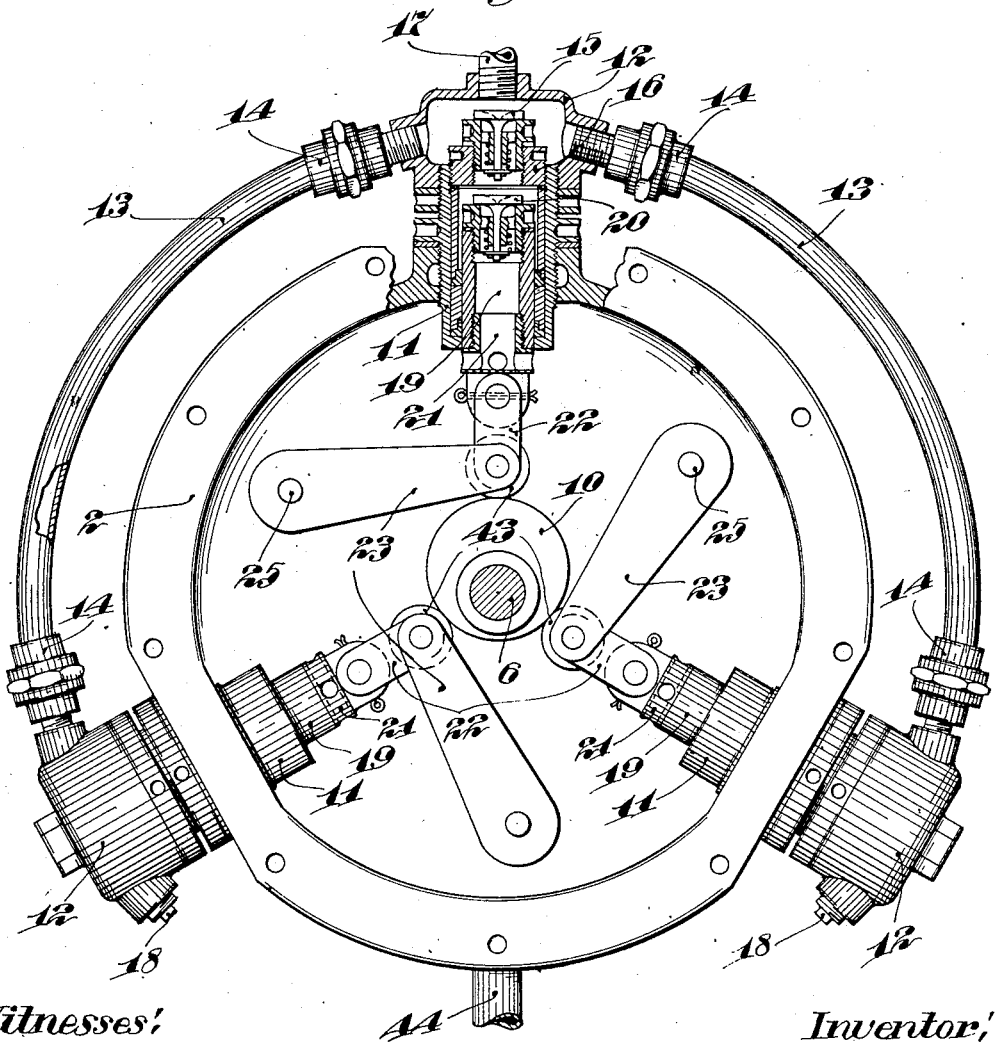

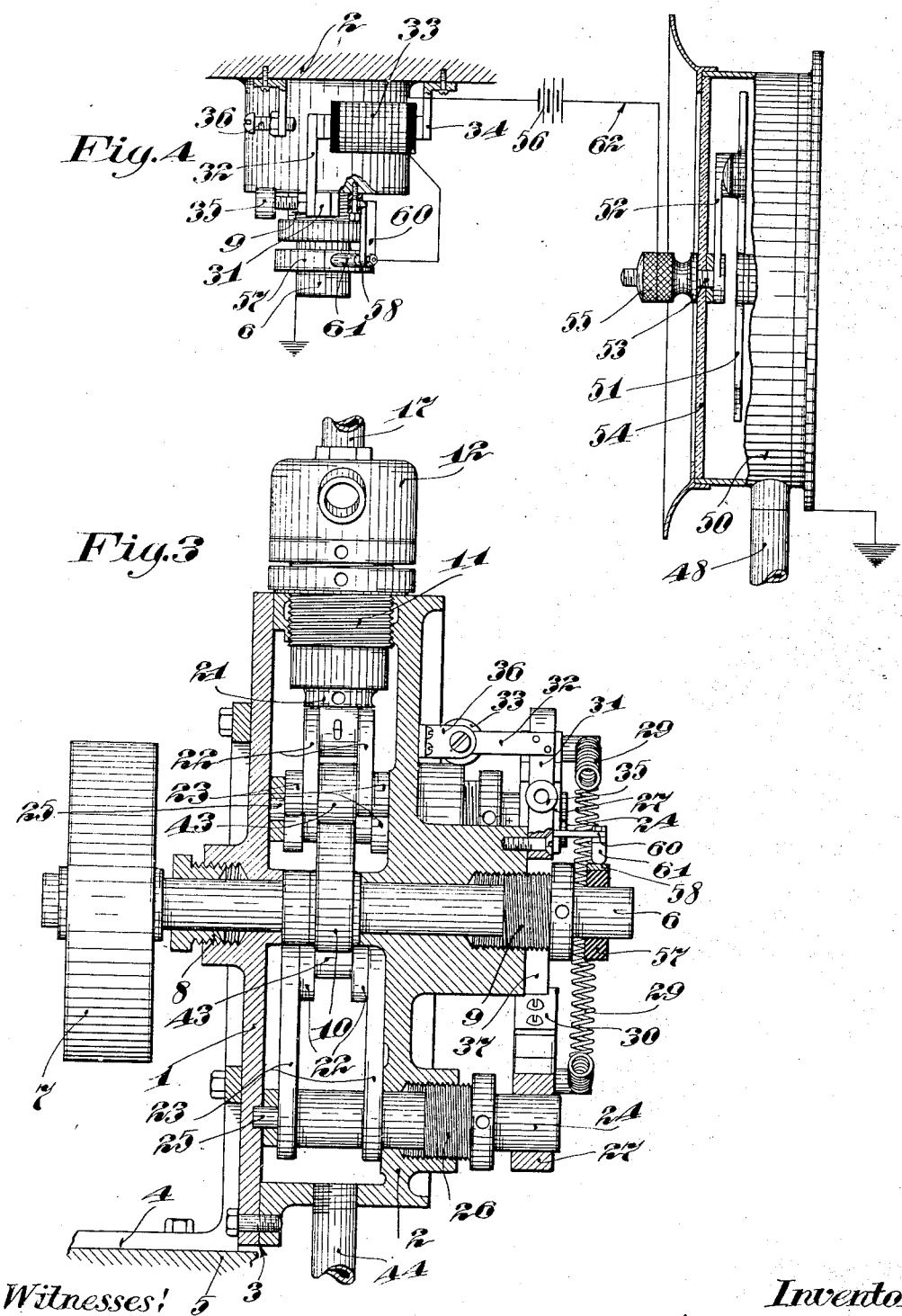

UNITED STATES PATENT OFFICE.

ROBERT CLARK MEALEY, OF MINNEAPOLIS, MINNESOTA.

MULTICYLINDER-PUMP.

1,109,349.   Specification of Letters Patent.   Patented Sept. 1, 1914.

Application filed July 21, 1913. Serial No. 780,157.

*To all whom it may concern:*

Be it known that I, ROBERT C. MEALEY, a citizen of the United States, residing at Minneapolis, in the county of Hennepin and State of Minnesota, have invented certain new and useful Improvements in Multicylinder-Pumps; and I do hereby declare the following to be a full, clear, and exact description of the invention, such as will enable others skilled in the art to which it appertains to make and use the same.

My invention has for its object to provide a highly efficient continuously acting multi-cylinder pump, and to such ends, generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a view in side elevation, showing the complete pump, some parts being broken away; Fig. 2 is a view in side elevation, showing the pump with one side of the casing removed and with some parts sectioned, and with some parts broken away; Fig. 3 is a vertical section taken approximately on the line $x^3$ $x^3$ on Fig. 1; and Fig. 4 is a view partly in plan and partly in elevation, showing part of the pump proper and a coöperating pressure gage, some parts being sectioned.

The casing of this improved pump is an approximately cylindrical structure made up of two sections 1 and 2, detachably connected with a water tight joint at 3. As shown, the case section 1 is provided with a base flange 4 adapting it to be bolted to a suitable support 5. The case sections 1 and 2 have axially alined hubs in which is journaled, and through which is extended a main shaft 6, provided at one projecting end with a pulley 7, over which a pair of driven belts, not shown, will be run, to rotate the said shaft. The hubs of the case sections 1 and 2 are shown as provided with stuffing boxes 8 and 9, respectively. Within the casing, the shaft 6 is provided with a pump actuating cam 10, which is preferably a true cylindrical eccentric. The casing section 2 is formed with a multiplicity, as shown three, radially disposed pump cylinders 11, shown as separately formed and screwed into the same with their inner ends projecting into the chamber of the said casing. The said cylinders 11 are spaced 120 degrees apart, and to the outer ends thereof, are attached, preferably by screw-threaded engagement, hollow valve chests 12. One of the valve chests 12, herein designated as the intermediate chamber, is connected to the other two valve chambers by segmental tubes 13, preferably made in sections with the sections thereof, connected by pipe couplings 14. Within the valve chests 12, are check valves 15, shown as applied to bushings 16 screwed into the outer ends of the respective cylinders 11. The three valve chests 12 are preferably constructed alike, the intermediate valve chest having an outwardly extended water discharge pipe 17, and the other two valve chests 12 having their lower side bosses closed by plugs 18.

Working within the pump cylinders 11 are tubular pump pistons 19, which, at their delivery ends, are equipped with check valves 20. The receiving or inner ends of the said pistons 19 are shown as provided with hollow heads 21, that are connected by links 22 to rocker arms 23 secured to rock shafts 24. The rock shafts 24, at their inner ends, have trunnions 25 (see Fig. 3), that are journaled in but do not project through the case section 1, while the other ends of the said rock shafts project through stuffing boxes 26 applied to the case section 2. To the outer ends of the rock shafts 24 are rigidly but adjustably secured bifurcated arms 27, the split ends of which embrace the said shafts and are rigidly clamped thereto by screws 28. The long ends of the said rocker arms 27 are connected by coiled springs 29, which operate as will hereinafter appear.
Also, each rock shaft 27, as shown, is provided with an attached wearing plate 30. The wearing plate 30 of the arms 27, which is connected to the piston of the so-called intermediate cylinder 11, (see Fig. 1), is preferably formed with a sharp inwardly extended edge 30ª that engages with a laterally projecting shoulder of a latch 31, shown as in the form of a lever, the inner end of which is pivoted to the hub of the case section 2. This latch lever 31 is provided with a laterally projecting armature 32 that is subject to a small electro-magnet 33, shown as secured to a supporting bracket 34 on the case section 2. An adjustable weight 35 applied to the latch lever 30 tends to move the same away from the electro-magnet, against an adjustable stop 36 supported on the case section 2.

The wearing plates 30 on the free ends of the other two arms 27 are adapted to engage shoulders of other latches, as shown, in the form of levers 37 pivoted at their inner ends to the hub of the case section 2. The right hand latch lever 37, as viewed in Fig. 1, is connected by a rod 38 to the short end of the first lever 27, to-wit, to the short end of that lever that is directly subject to the action of the latch lever 31. The same kind of a rod 38 connects the left and latch lever 37 to the short end of the lower arms 27. Preferably, light coiled springs 39 and 40 are compressed between the reduced short ends of the said levers 27, and stop collars 41 and 42 on the said rods 38.

At their free ends, the arms 23, which are within the pump casing 1 and 2, are subject to the cam eccentric 10, and to reduce friction, they are provided with rollers 43 that directly engage with the said cam. A water supply pipe 44 opens into the casing 1 and 2, as best shown in Fig. 3. The water discharge pipe 17, before noted, as shown, is directly connected to a four-way coupling 45, to which also, pipes 46, 47 and 48 are connected. The pipe 46 is the distributing pipe for conducting the water under pressure to the point where it is to be used. The pipe 47 is a vertical pipe which connects to the bottom of an equalizing tank 49. The pipe 48 is connected in the usual way to an ordinary pressure gage 50, the movable pointer 51 of which, in the present instance, serves as an electrode or an electrical contact. A second electrode in the form of a contact arm 52 has a stem 53, preferably located in axial line with the pivot of the combined pointer and contact arm 50. This stem 53 is extended through a glass dial 54 of the pressure gage, and is provided at its outer end with a knob or finger piece 55, by means of which the said contact arm 52 may be set in any desired position in respect to the pointer 51 and in respect to the graduated dial of the pressure gage.

The numeral 56 indicates a battery or source of electrical energy (see Fig. 4). The power driven means shaft 6, carries a commutator ring 57, of insulating material, and which is provided with a segmental metallic contact piece 58 (see Figs. 1 and 3). This contact piece 58 is grounded in the engine through a screw 59 which engages with the said contact piece 50 and shaft 6.

The numeral 60 indicates a small contact arm which is supported from the hub of the case section 2, but is insulated therefrom (see Fig. 4) and, at its free end, has a contact head or case 61 with which the contact piece 58 of the main shaft 6 is adapted to intermittently engage. By means of wires 62, the adjustable contact arm 52, the battery 56 and the electro-magnet 33 are connected to the head 61 of the contact arm 60.

Operation: It is evident that in order to cause the electro-magnet 33 to be energized from a battery 56, the battery circuit must be simultaneously closed at two points, to-wit, between the contact arm 52 and combined pointer and contact arm 51 of the pressure gage, in the one instance, and between the contact head 61 and segmental contact piece 58 in the other instance. Inasmuch as contact takes place between the said parts 58 and 61, once in each rotation of the shaft 6, it is evident that the energization of the magnets 33 is dependent primarily on contact between the arms or electrodes 51 and 52. The said arm 52 is adapted to be set in any desired adjustment for any desired pressure. When that pressure is reached, the automatic action of the pressure gage will close the contact between the said parts 51 and 52.

With the statements of action just given, in mind, the operation of the pump proper will be described.

Under rotation of the shaft 6, the cam 10 will operate on the rollers 43, in succession, to thereby in their regular order of succession, force the pump pistons 19, radially outward, or toward the delivery ends of the respective cylinders 11, so that the several pumps are given their working strokes in succession, the one overlapping with the other, so as to give a practically continuous pressure. Obviously, the valves 15 open under compression strokes and the valves 20 open under return or radial inward movements of the pistons, or when the pistons draw in their supply of water to the cylinders. Water discharged from the several cylinders will create an increasing pressure, which will be effective in the service pipe 46, in the equalizing tank 49 and in the pressure gage 50. Air caged in the upper portion of the equalizing tank 49 will absorb shocks and tend to maintain an approximately constant pressure. When the predetermined pressure in which the contact arm 52 is set, has been reached, the arms 51 and 52 will be thrown into contact, thereby closing the magnet and battery circuit except between the contact head 61 and segmental rotary contact 58. The contact 58 is so located in respect to the cam 10 that it will be in engagement with the contact head 61 for a short interval of time during each complete rotation of the shaft 6, and while the cam 10 is forced to its extreme outward or delivery position, a piston 19 of the so-called intermediate cylinder, at which time the arm 27 shown at the right, in Fig. 1, is moved outward to its extreme position, with the edge 30ª of its wearing plate 30, so far outward that the shoulder of the primary latch lever 31 will move under the same, when the said magnet is energized and caused to move the said lever 31 into its operative position, as shown in Fig. 1. When the said edge 30ª is engaged with the shoulder of the said lever 31, as stated and shown in Fig. 1, the frictional engagement between the same, produced by the springs 29, will be sufficient to hold the said lever in its operative position even after the magnet circuit 33 has been broken by movement of the contact 58, out from under the contact head 61. When the said right hand arm 27 is moved out of and secured, as just stated, it sets its latch lever 37 in position to intercept and lock in an outward position, the next adjacent arm 27, and, in turn, when this latter or second arm is moved and locked in its outer position, it will set its connecting latch lever 37 in position to lock in an outer position the next or third arm 27. To accomplish the above action requires one complete rotation of the cam 10, because the arms 27 can be locked in their outermost positions only while they are forced outward by the cam 10. Fig. 1 indicates the position of the arms 27 after they have once been set in that position, and while the pressure still remains near enough to the predetermined pressure to hold the electrodes or contact arms 51 and 52 in electrical engagement, but regardless of the intermediate engagement between the contacts 58 and 61.

Obviously, there is one time during each rotation of the cam 10, when, if the magnets 33 remain not energized, the latch 31 would by its weight 35, be thrown back into an inoperative position, and that time is when the said cam 10 gives a slight outward movement to the said right hand lever 27. At this time, however, the contacts 58 and 61 are engaged and the said magnet energized so that the latch 31 is held until frictional engagement is again established between the edge 30ª and the shoulder of the said latch 31.

Obviously, when the pistons are all locked in their delivery positions, as just stated, rotation of the cam 10 will produce no pumping action whatever. When the pressure, due to this temporary inaction of the pumps, is reduced, so as to throw the pointer, or electrode 51 out of engagement with the electrode or arms 52, the battery magnet circuit will be broken so that the magnet will not be energized at the next critical time, to-wit, when the contact 58 is engaged with the contact head 61, and hence, the latch 31, by its weight 35, will be thrown into an inoperative position, thereby releasing the right hand arms 27 (Fig. 1). When this arm is released, the springs 29 will force the free end of the same inward, and one after the other, the said arms will be released, thereby throwing the pump again into action.

A pump of the character above described, may be used for a great many purposes. Generally stated, it is designed to pump water or other liquid under approximately constant predetermined pressure, which predetermined pressure is variable, at will, by proper setting of the movable contact of the pressure gage. The pump might even be used as an air pump. It has this important improved feature of construction, to wit, that all of the joints between the moving parts of the pump are on the receiving or lower pressure side.

A pump of this character will be found especially serviceable for use in liquid spraying apparatus, such as used in spraying trees, and for throwing whitewash, for example.

What I claim is:

1. The combination with a plurality of pumps and continuously driven means for operating the same, of latches for temporarily securing said pumps against action, and pressure actuated means for rendering said latches progressively active to render said pumps inoperative.

2. The combination with a plurality of pumps and continuously driven means for operating the same, of normally inoperative latches for securing said pumps against action, pressure actuated means for operating one of the said latches, and means whereby the operation of the first latch will progressively cause the operation of the other latches and to progressively render the said pump temporarily inoperative.

3. The combination with a plurality of reciprocating pumps connected to deliver to a common source, of normally inoperative latches movable to render said pumps temporarily inoperative, a pressure gage having two electrodes, the one movable by varying pressure therein, and the other adjustable into different positions for engagement under different predetermined pressures, an electric circuit including said electrodes, a source of electric energy and an electro-magnet, the said electro-magnet when energized being operative on one of the said latches to render the same operative, and the other latches having connections whereby they are rendered operative in succession by coöperating pumps.

4. The combination with a pump casing having an inlet for the supply of fluid to be pumped, of a plurality of cylinder and piston pumps connected to receive from said casing and having their delivery ends connected to the common discharge pipe, a rotating cam in said casing operating in succession on the pistons of said pumps, rock shafts connected to the several pump pistons and provided with spring retracted arms, yielding retracted latches operative on said arms to temporarily secure the pistons of said pumps against action, and pressure actuated means for rendering said latches operative.

5. The combination with a pump casing having an inlet for the supply of fluid to be pumped, of a plurality of cylinder and piston pumps connected to receive from said casing and having their delivery ends connected to the common discharge pipe, a rotating cam in said casing operating in succession on the pistons of said pumps, rock shafts connected to the several pump pistons and provided with spring retracted arms, yielding retracted latches operative on said arms to temporarily secure the pistons of said pumps against action, yielding retracted latches operative on said arms to support the pistons of said pumps against action, pressure actuated means operative directly on one of said latches to render the same operative on the coöperative arm, the other latches having connections to adjacent arms whereby they are rendered operative by movements of the arms to which they are connected.

6. The combination with a pump casing having an inlet for the supply of fluid to be pumped, of a plurality of cylinder and piston pumps connected to receive from said casing and having their delivery ends connected to the common discharge pipe, a rotating cam in said casing operating in succession on the pistons of said pumps, rock shafts connected to the several pump pistons and provided with spring retracted arms, yielding retracted latches operative on said arms to temporarily secure the pistons of said pumps against action, a pressure gage having electrodes, one of which is subject to varying pressure therein and the other of which is set for engagement with the said pressure actuated electrode under predetermined pressure, an electric circuit including the said electrodes, a source of electrical energy, and a magnet, which magnet, when energized is operative on one of said latches to render the same operative on one of the said arms, and the other latches being connected, progressively to said arms and arranged to be directly rendered operative thereby.

7. The combination with a pump casing having an inlet for the supply of fluid to be pumped, of a plurality of cylinder and piston pumps connected to receive from said casing and having their delivery ends connected to the common discharge pipe, a rotating cam in said casing operating in succession on the pistons of said pumps, rock shafts connected to the several pump pistons and provided with spring retracted arms, yielding retracted latches operative on said arms to temporarily secure the pistons of said pumps against action, a pressure gage having electrodes, one of which is subject to varying pressure therein and the other of which is set for engagement with the said pressure actuated electrode under predetermined pressure, an electric circuit including the said electrodes, a source of electrical energy, and a magnet, which magnet, when energized is operative on one of said latches to render the same operative on one of the said arms, and the other latches being connected, progressively, to said arms and arranged to be directly rendered operative thereby, and the said circuit also including a relatively fixed and rotary segmental contact which latter contact is timed for movement with said rotating cam.

In testimony whereof I affix my signature in presence of two witnesses.

ROBERT CLARK MEALEY.

Witnesses:
 HARRY D. KILGORE,
 F. D. MERCHANT.